(12) United States Patent
Perez et al.

(10) Patent No.: US 11,977,868 B2
(45) Date of Patent: May 7, 2024

(54) SEARCH BASED APPROACH FOR GENERATING CONTROLLER MODELS

(71) Applicant: Palo Alto Research Center Incorporated, Palo Alto, CA (US)

(72) Inventors: Alexandre Perez, San Mateo, CA (US); Ion Matei, Sunnyvale, CA (US); Peter Patel-Schneider, Westfield, NJ (US); Johan de Kleer, Los Altos, CA (US); Ron Zvi Stern, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 75 days.

(21) Appl. No.: 17/568,585

(22) Filed: Jan. 4, 2022

(65) Prior Publication Data

US 2023/0214197 A1 Jul. 6, 2023

(51) Int. Cl.
*G06F 8/41* (2018.01)
*G05B 6/02* (2006.01)
*G06F 8/53* (2018.01)
*G06F 8/75* (2018.01)

(52) U.S. Cl.
CPC .............. *G06F 8/44* (2013.01); *G05B 6/02* (2013.01); *G06F 8/53* (2013.01); *G06F 8/75* (2013.01)

(58) Field of Classification Search
CPC ..... G06F 8/44; G06F 8/53; G06F 8/75; G05B 6/02
See application file for complete search history.

(56) References Cited

U.S. PATENT DOCUMENTS

| | | | |
|---|---|---|---|
| 2016/0179992 A1* | 6/2016 | Van der Velden | G06F 30/00 703/2 |
| 2018/0203677 A1* | 7/2018 | Hughes | G06F 8/61 |
| 2018/0373507 A1* | 12/2018 | Mizrahi | G06F 18/24 |
| 2021/0056211 A1* | 2/2021 | Olson | G06N 5/01 |
| 2022/0067538 A1* | 3/2022 | Choudhary | G06F 8/433 |
| 2022/0179374 A1* | 6/2022 | Kaberg Johard | G05B 13/042 |
| 2023/0106530 A1* | 4/2023 | Chakrabarty | G05B 17/02 700/31 |

* cited by examiner

*Primary Examiner* — Qing Chen
*Assistant Examiner* — Amir Soltanzadeh
(74) *Attorney, Agent, or Firm* — Womble Bond Dickinson (US) LLP (57) ABSTRACT

A method includes obtaining a binary code of a controller. The method also includes decompiling the binary code of the controller to generate a source code. The method further includes generating one or more abstract syntax trees based on the source code. The method further includes generating an interpretable model based on the one or more abstract syntax trees. The interpretable model is interpretable by subject matter experts.

20 Claims, 6 Drawing Sheets

SEARCH BASED APPROACH FOR GENERATING CONTROLLER MODELS

TECHNICAL FIELD

Implementations of the present disclosure relate to generating controller models, and more particularly to a search-based approach for generating controller models.

BACKGROUND

Many devices and/or systems have controllers (e.g., control systems, control software) that control the operation of the devices/systems. For example, a robot or a helicopter drone may include a controller that controls how the robot/drone moves. These controllers are often installed on the devices/systems in the form of binary code. For example, source code may be compiled into the binary code which may be loaded/installed onto the devices/systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Methods and systems related to generating models for controllers (e.g., control systems) are described herein. The systems described herein automatically solve the problem of generating controller models (e.g., proportional-integral-derivative (PID) controllers and variants, or state-space controllers) from binary code (e.g., large scale binary code), in a format that is interpretable by subject matter experts (SMEs). The SMEs may be considered to be robotics and control engineers in the context described herein, or any other suitably-experienced personnel. In one embodiment, interpretability speaks to the extraction of insights for a particular audience (e.g., SMEs) into a chosen domain problem about domain relationships contained in a data or model.

Furthermore, SME-interpretable models may be represented using the Modelica language merely as a non-limiting example of any other suitable SME-interpretable model. The benefits of using Modelica are twofold: 1) Modelica is a popular language for describing control algorithms, supported by open-source modeling tools (e.g., OpenModelica or JModelica) and 2) Modelica enables the code generation process of translating a model to binaries, since Modelica models can be mapped automatically into the C programming language or the C++ programming language through the Functional Mockup Interface (FMI) standard. FMI is a standard that defines a container and an interface to exchange dynamic models.

The mapping outputs are Functional Mockup Units (FMUs) expressed as C code or C++ source code, which encodes the controller behavior. In general, source code may be generated using decompilers. Decompilers may be tools (e.g., software, applications, systems) that reverse-engineer binary code to derive a source code in a higher-level programming language. Decompilers employ data flow analysis algorithms to identify function parameters and return values, recover high-level expressions, and identify standard control structures using graph structuring algorithms. Decompiled source code is often difficult to comprehend, however, as the decompiled source code lacks high-level mathematical semantics. In addition, not all decompiled source code is useful for control engineers, e.g., code related to I/O operations from/to sensors/actuators.

Given the widespread support of the FMI standard, Modelica may easily be replaced with a proprietary language such as Matlab/Simulink. Advantageously, the rest of the processes for model generation/construction remain unchanged. The Simulink models have a well understood grammar and can be converted into FMUs similar to Modelica models. The model construction/generate approaches can be repurposed for other computing architectures provided a decompiler is available. For example, an interpretable model can be generated based on PLC binary code using the proprietary JEB Decompiler for S7 PLC to generate source code.

Some purely data-driven embodiments address model generation/creation using genetic programming (GP) to learn physical laws by discovering operators between variables and their derivatives. However, these approaches do not scale with the problem size (e.g., for larger or more complex binaries), are sensitive to noisy data, and do not often contain interpretable semantics. More recent model learning approaches use regression parameterizations that learn sparse models. However, these other approaches require manually engineered features and are sensitive to noisy data. The drawbacks of these approaches are that they require a very large amount of experimental data and do not guarantee an SME-interpretable format.

The present disclosure overcomes the above problems, and others, by describing methods and systems related to generating interpretable models based from binary code. Specifically, the methods and systems described herein overcome the above problems, and others, by decompiling source code, identifying/isolating mathematical primitives in the source code, generating abstract syntax trees (ASTs) based on the mathematical primitives, and generating an interpretable model (e.g., a Modelica model) based on the ASTs.

The interpretable model is tested using code generation tools to generate working C code or C++ code for a given Modelica model. These code generation tools work through the Functional Mockup Interface (FMI) standard, which is a free standard that defines a container and an interface to exchange dynamic models. The mapping outputs are Functional Mockup Units (FMUs) expressed as C code or C++ code, which encodes the controller behavior. The FMUs are embedded into control software projects (CSPs), where input/output (I/O) operations for interacting with sensors and actuators are implemented. Examples of such CSPs are robotics applications, e.g., implemented in the Robot Operating System (ROS). The test binary code can be generated based on the CSPs and tested/validated against the original binary code.

Figure 1:
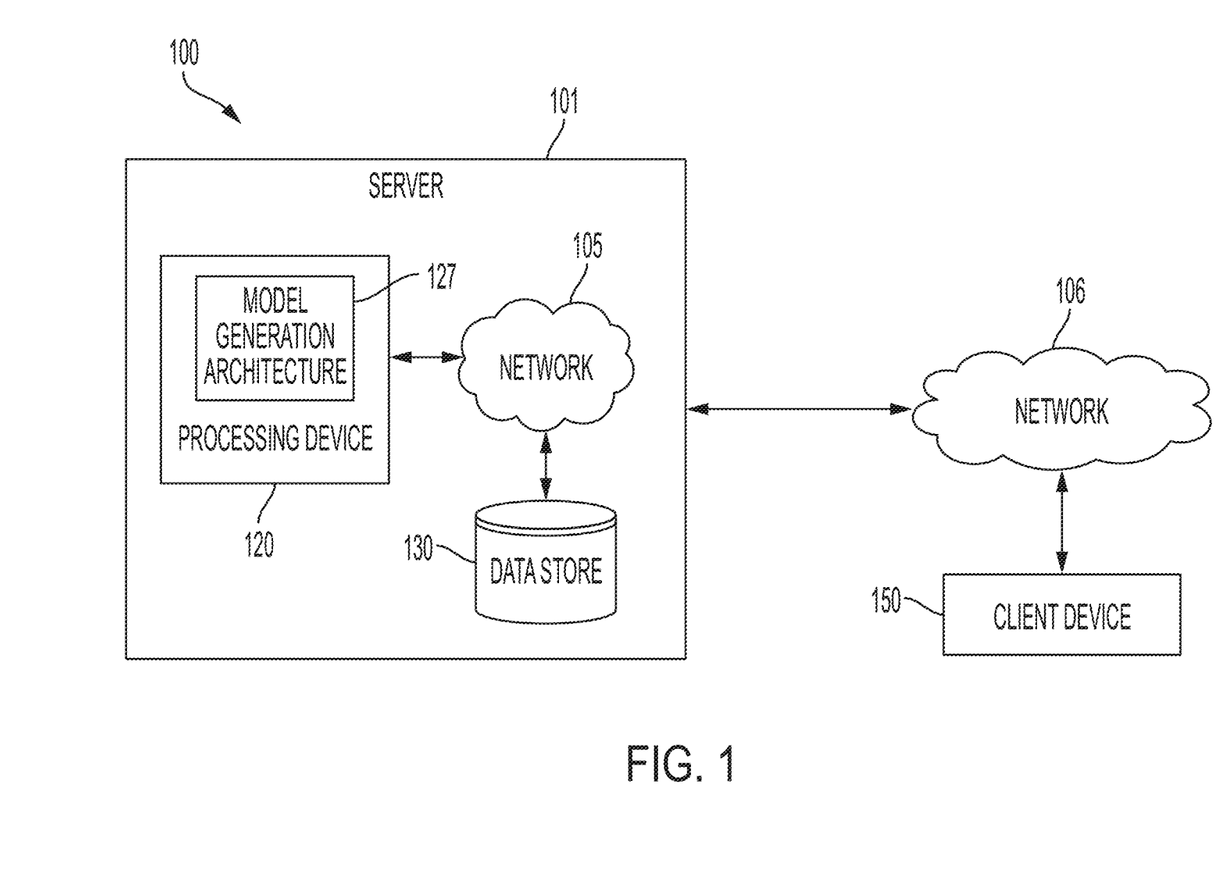
FIG. 1 is a diagram showing a system for use with implementations of the present disclosure.

FIG. 1 is a diagram showing a system 100 for use with implementations of the present disclosure. Although specific components are disclosed in system 100, it should be appreciated that such components are examples. That is, embodiments of the present invention are well suited to having various other components or variations of the components recited in system 100. It is appreciated that the components in system 100 may operate with other components than those presented, and that not all of the components of system 100 may be required to achieve the goals of system 100.

In one embodiment, system 100 includes server 101, network 106, and client device 150. Server 100 may include various components, which may allow for interpretable models to be generated based on a binary code (e.g., a binary file, a binary) for a controller or control system. Each component may perform different functions, operations, actions, processes, methods, etc., for a client device and/or may provide different services, functionalities, and/or resources for the client device. Server 100 may include model generation architecture 127 of processing device 120 to perform operations related to generating/creating interpretable models and/or testing the interpretable models. In one embodiment, processing device 120 comprises one or more graphics processing units of one or more servers (e.g., including server 101). Additional details of model generation architecture 127 are provided with respect to FIGS. 2-6. Server 101 may further include network 105 and data store 130.

The processing device 120 and the data store 130 are operatively coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g., cell towers), etc. The network 105 may carry communications (e.g., data, message, packets, and frames) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD) or solid-state drive (SSD)), and other hardware devices (e.g., sound card and video card). The server 100 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications) and/or may manage access to the hardware (e.g., processors, memory, and storage devices) of the computing device.

As discussed herein, the server 101 may provide model generation functionality (e.g., functionality to generate interpretable models) to a client device (e.g., client device 150). In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, and frames) between the various components of system 100. Further implementation details of the operations performed by server 101 are described with respect to FIGS. 2-6.

In some embodiments, the model generation architecture 127 may decompile a binary file/code for a controller. The model generation architecture 127 may detect and/or isolate source code containing mathematical primitives. The model generation architecture 127 may generate code-level ASTs for the mathematical primitives. The model generation architecture 127 may also convert the code-level ASTs to model-level ASTs. The model generation architecture 127 may further compose an interpretable model (e.g., a Modelica model) from a set of model-level ASTs.

The model generation architecture 127 may use existing code generation tools to generate working C code or C++ code for a given Modelica model. These code generation tools may work through the Functional Mockup Interface (FMI) standard, which is a free standard that defines a container and an interface to exchange dynamic models. The mapping outputs are Functional Mockup Units (FMUs) expressed as C code or C++ code, which encodes the controller behavior. The FMUs are embedded into control software projects (CSPs), where input/output (I/O) operations for interacting with sensors and actuators are implemented. Examples of such CSPs are robotics applications, e.g., implemented in the Robot Operating System (ROS). The CSPs may be used to generate a test binary code, which may be used to test the accuracy, correctness, etc., of the interpretable model.

Figure 2:
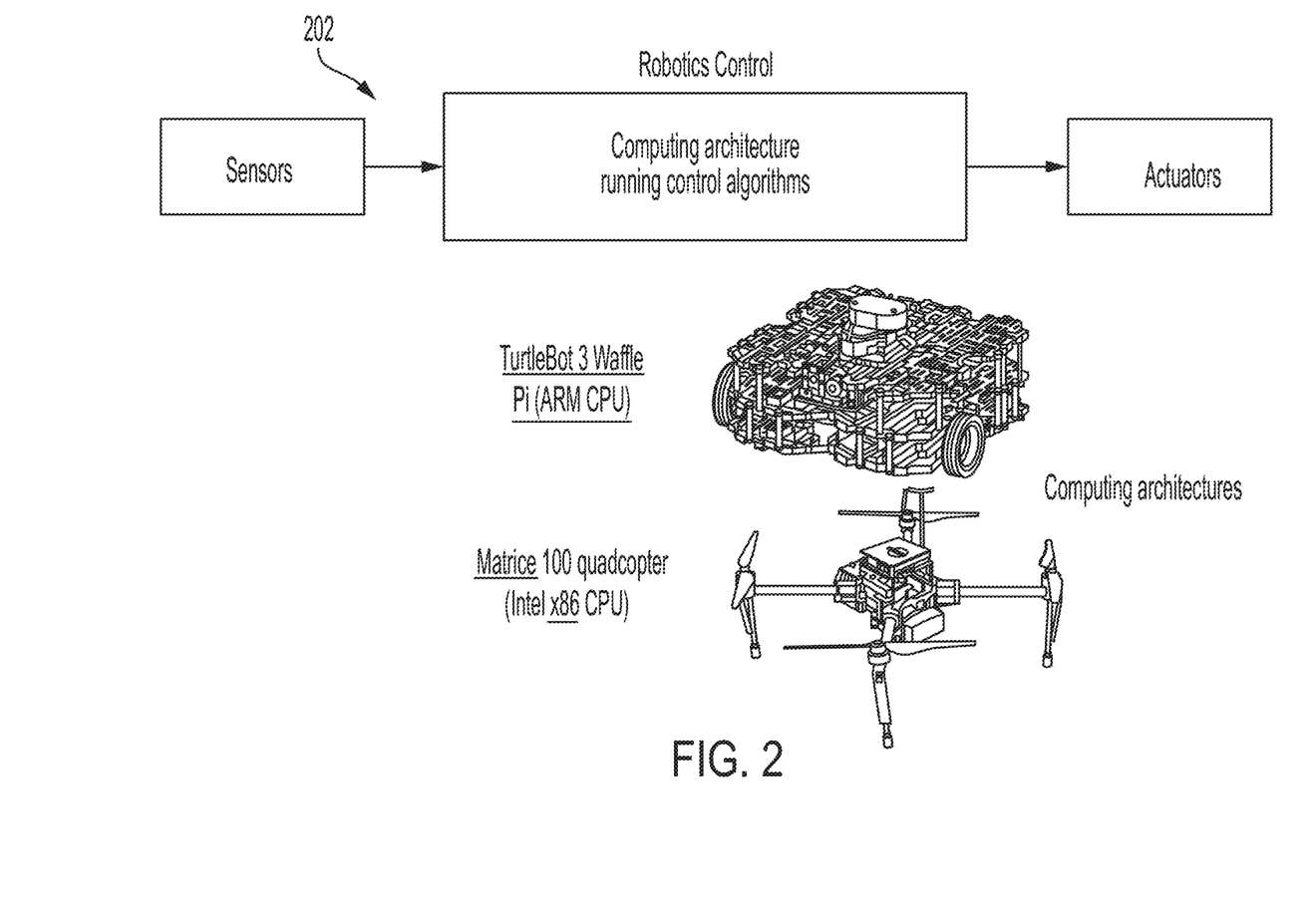
FIG. 2 is a graphical diagram showing example devices that may use controllers and/or controller systems, in accordance with some embodiments.

FIG. 2 is a graphical diagram 200 showing example devices that may use controllers and/or controller systems, in accordance with some embodiments. The first (e.g., bottom) device is a Matrice 100 quadcopter and the second (e.g., top) device is a TurtleBot 3 Waffle Pi ground robot. The two devices may use different computing/system architectures. The Matrice 100 quadcopter uses an Intel x86 CPU architecture and the TurtleBot 3 Waffle Pi ground robot uses an ARM CPU architecture. The devices, controllers, and computing architectures described herein are merely for convenience and brevity, any other suitable architectures are contemplated.

As discussed above, it may be useful to generate SME interpretable models for the controllers and/or controller systems of the example devices. In some embodiments, SME-interpretable models are represented herein using the Modelica language merely as a non-limiting example of any other suitable SME-interpretable model. The mapping outputs are FMUs expressed as C source code or C++ source code, which encodes controller behavior.

In one embodiment, FMUs may be embedded into control software projects (CSPs), where input/output (I/O) operations for interacting with sensors and actuators are also implemented. For the robotics application 202, the CSP may be based on a combination of platform onboard Software Development Kit (SDK) and the Robot Operating System (ROS) (e.g., a collection of frameworks for developing the software architecture of robotic systems).

Figure 3:
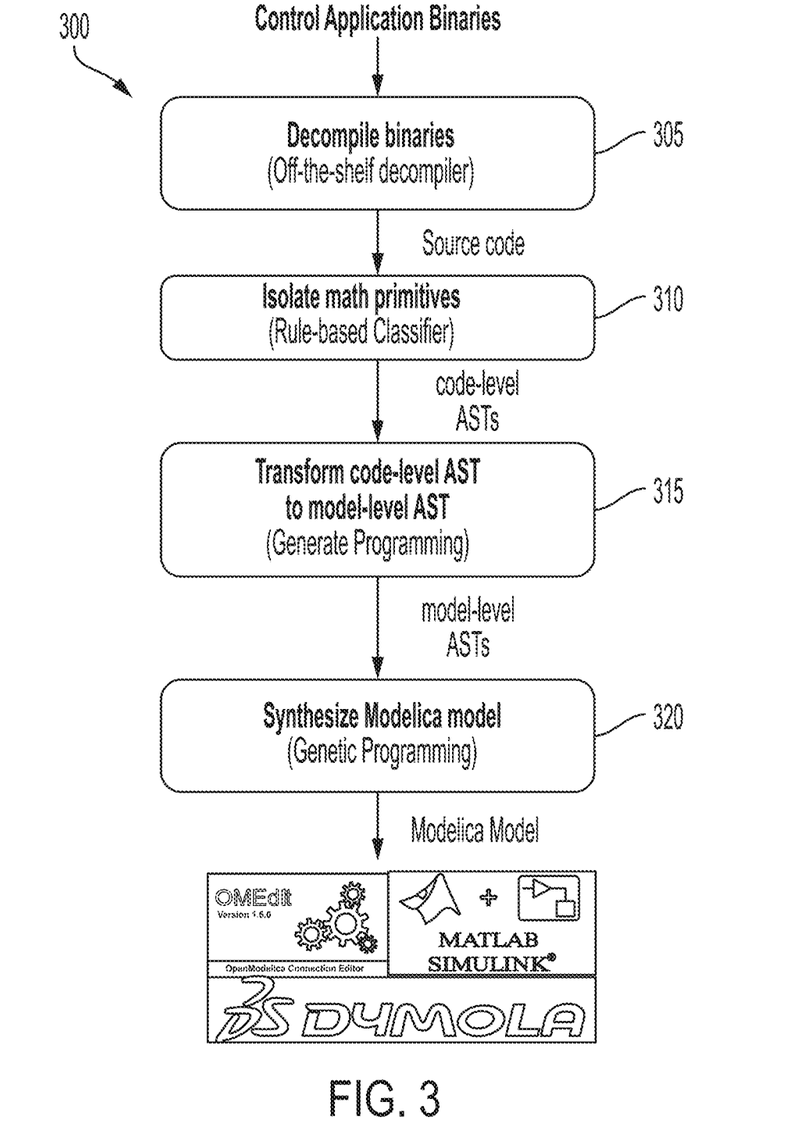
FIG. 3 is a graphical diagram showing a method of generating controller models, in accordance with some embodiments.

FIG. 3 is a graphical diagram showing a method of generating controller models (e.g., interpretable models of controllers), in accordance with some embodiments. For example, the processes described with reference to FIG. 3 may be performed by processing logic of model generation architecture 127 as described with reference to FIG. 1.

As illustrated in FIG. 3 the method may receive or otherwise obtain (e.g., read from a memory) binary code of a controller (e.g., a controller system). For example, the binary code may be for the Matrice 100 quadcopter illustrated in FIG. 2. The binary code may also be referred to as a binary, a binary file, etc. At block 305, the binary code is decompiled. In one embodiment, an application, software, or some other system may be used to decompile the binary code into source code. For example, a decompiling software/system may decompile the binary code into C code, C++ code, JAVA code, etc.

At block 310, one or more mathematical primitives in the source code may be identified and/or isolated. In one embodiment, a mathematical primitive may be a software segment (a portion of source/binary code) that is responsible for implementing a mathematical process. In the case of FMUs, equations may be implemented as separate functions, each of which may be considered as a mathematical primitive. To enable scaling to large codebases with longer and/or more complex mathematical formulations, method 300 may first discover (e.g., identify) and isolate the mathematical primitives. Subsequent operations or blocks may then operate on software artifacts at the granularity of individual mathematical primitives. These mathematical primitives may be identified by identifying code segments with mathematical functionality from the rest of the code that may perform other functions, operations, actions, etc. For example, the portions of source code with mathematical primitives may be isolated from other source code that handles input handling, actuation, logging, threading, etc. To perform this classification or identification, the method 300 may use a rule-based classifier that discovers/identifies mathematical primitive candidates by considering calls to math libraries (e.g., dynamic link libraries (DLLs), I/O calls, logging, and threading). The rule-based classifier may also identify portions of code that use mathematical operators and/or functions (e.g., addition, subtraction, multiplication, division, integration, and differentiation). In some embodiments, the method 300 may also use a machine learning based classifier. For example, machine learning systems, such as neural networks, support vector machines, etc., may be used.

After identifying the mathematical primitives, the method 300 may also isolate the mathematical primitives from the source code. Isolating the mathematical primitives may allow the mathematical primitives to be executed in a standalone manner. In the case of mathematical primitives that manipulate state, the method 300 may automatically generate a bootstrapping entry point that creates a mock-up of any state required or used by the mathematical primitive. This state (e.g., the mock-up of the state) can be created by inspecting the runtime behavior from the original code at the time the software segment/portion of interest is invoked. The isolation procedure will use program/code rewriter that removes sources of non-determinism from within the mathematical primitive. For example, the program/code rewriter may move any non-deterministic calls into the bootstrapping region and use dependency injection to change the interface of the mathematical primitive. The method 300 may also leverage detection techniques from software reconnaissance and feature localization to improve accuracy of our math primitive localization.

Figure 4:
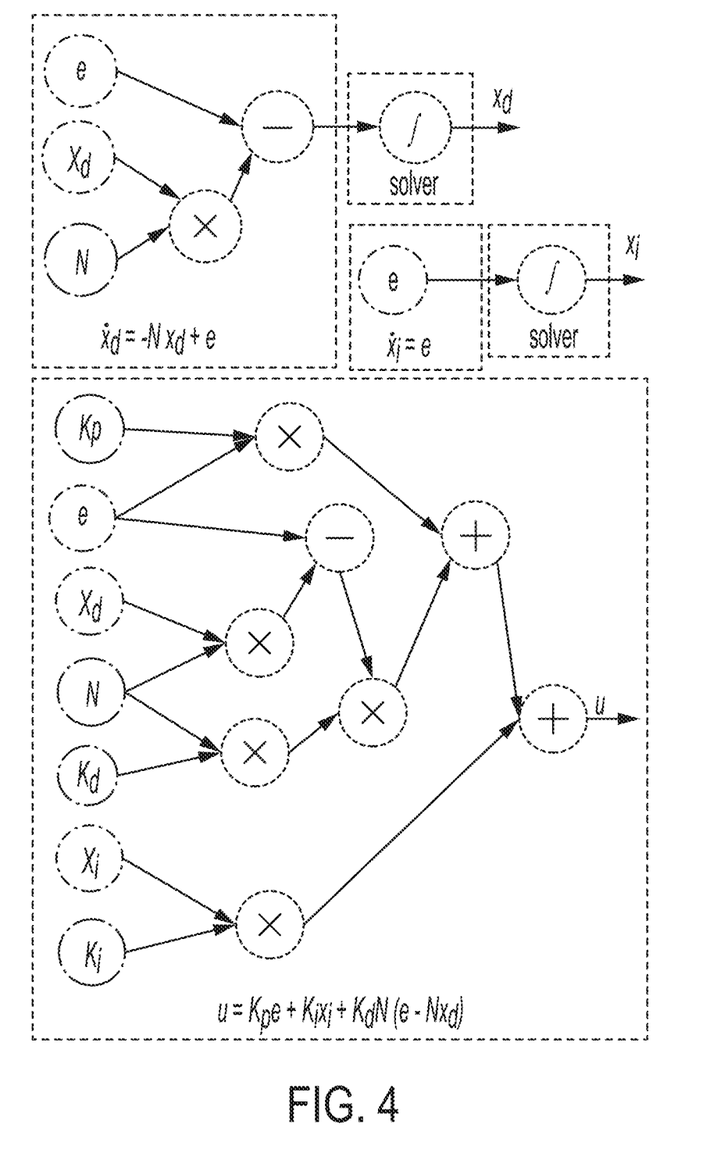
FIG. 4 illustrates a collection of symbolic ASTs corresponding to the mathematical primitives of the state-space representation of the PID controller, according to some embodiments.

At block 315, the method 300 may generate abstract syntax trees (ASTs) based on the source code. As discussed above, mathematical primitives may be isolated from the source code. The method 300 may generate code-level ASTs for the mathematical primitives. For example, the method 300 may generate a code-level AST for each mathematical primitive. A code-level AST may be an AST that is generated based on source code, such as C code or C++ code. The method 300 may also transform code-level ASTs to model-level ASTs. The method 300 may also transform the code-level ASTs to model-level ASTs. For example, the method 300 may convert every code-level AST to a functionally equivalent model-level AST. The model-level ASTs may be specified or defined using the Modelica grammar/syntax. Examples of model-level ASTs are illustrated in FIG. 4.

In one embodiment, the transformation from code-level ASTs to model-level ASTs may be performed using genetic programming (GP). For example, GP may be used to search the space of AST-to-AST operation sequences. An AST-to-AST operation is a transformation of one part of the code-level AST to a part of the model-level AST. The set of possible AST-to-AST operations may be generated automatically from examples of a Modelica code generation process. The generated code from the examples may be properly annotated. This may allow the method 300 to create a training set of examples from which to learn the set of AST-to-AST operators.

At block 320, the method 300 may create an interpretable model based on the model-level ASTs. For example, the method 300 may create or synthesize a Modelica model based on the model-level ASTs. The Modelica model may be a model that is interpretable (e.g., readable, understandable) by SMEs. The method 300 may transform the set of model-level ASTs to a complete Modelica model that is functionally equivalent to the given binaries. In one embodiment, the method 300 may search the space of possible model-level AST compositions using GP. Each candidate solution may be a composition of the model-level ASTs created in block 315. The set of possible composition operators in a candidate solution may be extracted from a modeling tool's grammar. The method 300 may also use a symbolic regressor or symbolic regression to create the interpretable model (e.g., a Modelica model) instead of the GP.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

FIG. 4 illustrates a collection of symbolic ASTs corresponding to the mathematical primitives of the state-space representation of the PID controller, according to some embodiments. As discussed above, mathematical primitives may be identified in the source code for a binary (e.g., binary code, a binary file). These mathematical primitives may be isolated from source code and code-level ASTs may be generated based on the mathematical primitives. The code-level ASTs may be converted to the model-level ASTs illustrated in FIG. 4. As illustrated in FIG. 4, the leaf nodes of the ASTs may correspond to operands of different mathematical functions/operations and the other nodes (e.g., non-leaf nodes) may correspond to the mathematical functions/operations of the mathematical primitives.

Figure 5:
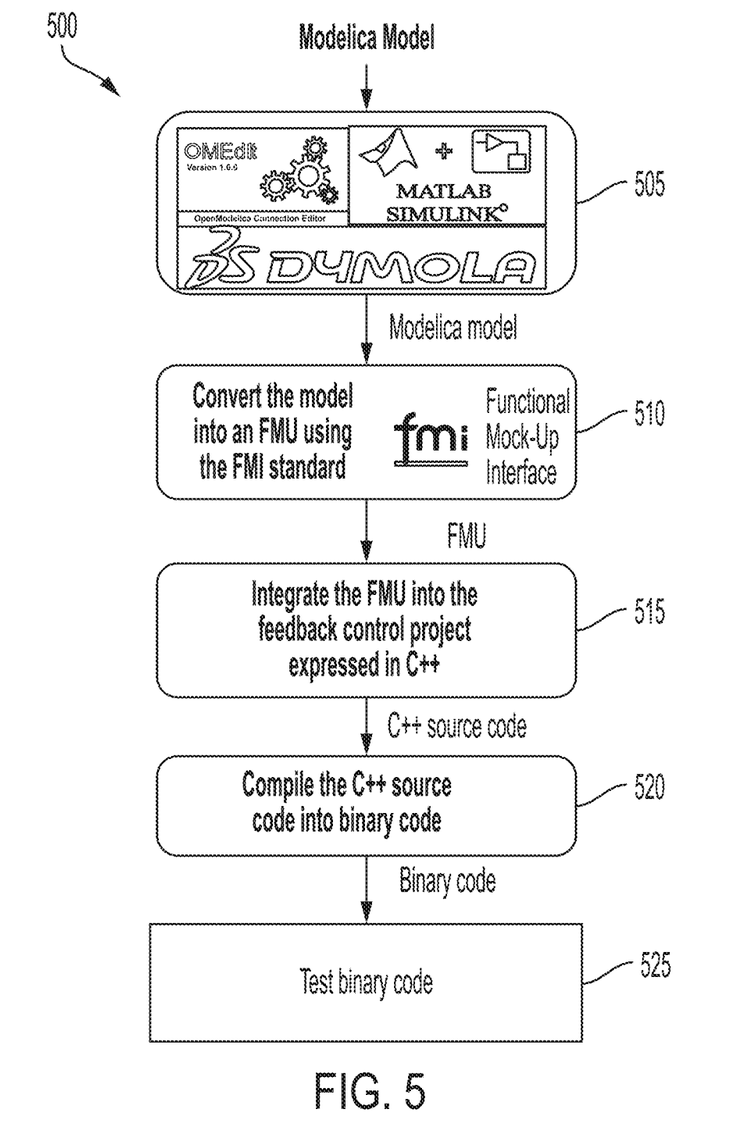
FIG. 5 is a graphical diagram showing a method 500 of testing an interpretable model, in accordance with some embodiments.

FIG. 5 is a graphical diagram showing a method 500 of testing an interpretable model, in accordance with some embodiments. For example, the processes described with reference to FIG. 4 may be performed by processing logic of model generation architecture 127 as described with reference to FIG. 1. The method 500 may generate binary code from an interpretable model (e.g., a model that may be interpretable or understandable by an SME), such as Modelica model. Modelica enables using off-the-shelf open-source tools to generate FMUs and eventually a C++ function for each equation of the Modelica model. Moreover, Modelica shares similarities with commercial tools that are commonly used in industry and academia for control applications (e.g. Matlab/Simulink). A second binary code is generated based on the interpretable model and tested against the original binary code used to generate the interpretable model.

At block 505, an interpretable model, such as a Modelica model is received. The interpretable model may have been generated based on decompiled source code. The decompiled source code may have been generated based on the binary code of a controller or controller/control system, as discussed above.

At block 510, the method 500 may convert the model into one or more FMUs. The one or more FMUs describe the mathematical model of a dynamical system as C++ code. FMUs implement the FMI standard that is supported by more than 100 modeling and simulation tools. Such tools include both commercial and free tools using the Modelica language (e.g., OpenModelica, JModelica, Dymola). Consequently, source code can automatically be generated corresponding to Modelica models that is included in CSPs. Such technologies enable the automatic generation of new Modelica models with randomized order of variables, parameters and equations, leading to a factorial increase in the number of training examples. FMU objects can be generated not only from Modelica models but also from Matlab/Simulink models.

At block 515, the one or more FMUs are integrated into a control software project (CSP) expressed in either C or C++. In other embodiments, any other suitable high-level code may be used for the CSP. In addition to the controller behavior, the CSPs may include I/O and/or timing or scheduling operations. At block 520, the source code (e.g., C source code, C++ source code, JAVA code, or any other high-level code) may be compiled into binaries (i.e., binary code or binary file).

At block 525, the binary code (compiled at block 52) may be tested. For example, the binary code may be tested against the original binary code that was used to generate the interpretable model.

To calculate a fitness score for a candidate solution, the method 500 may obtain tests for the given controller code, execute them, and trace the program's state during execution. For example, automated test-suite generation tools may be used to create a comprehensive set of inputs (e.g., persistent signals) that sufficiently cover the target mathematical primitive's functionality. The method 500 may trace the state before and after executing every mathematical primitive. This trace will result in a vector of state values throughout the test's execution. Then, the system simulates the execution of this test in the composed Modelica model using the modeling tool and monitors the state values during this simulation. The difference between the traces will serve as the fitness function. If needed, the system uses heuristics to guide the search towards known controller templates. The fitness function may be the mean square error (MSE) loss function over the distance between expected outcome (e.g., the mathematical primitive output) and the observed outcome (e.g., the model simulation output).

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 6:
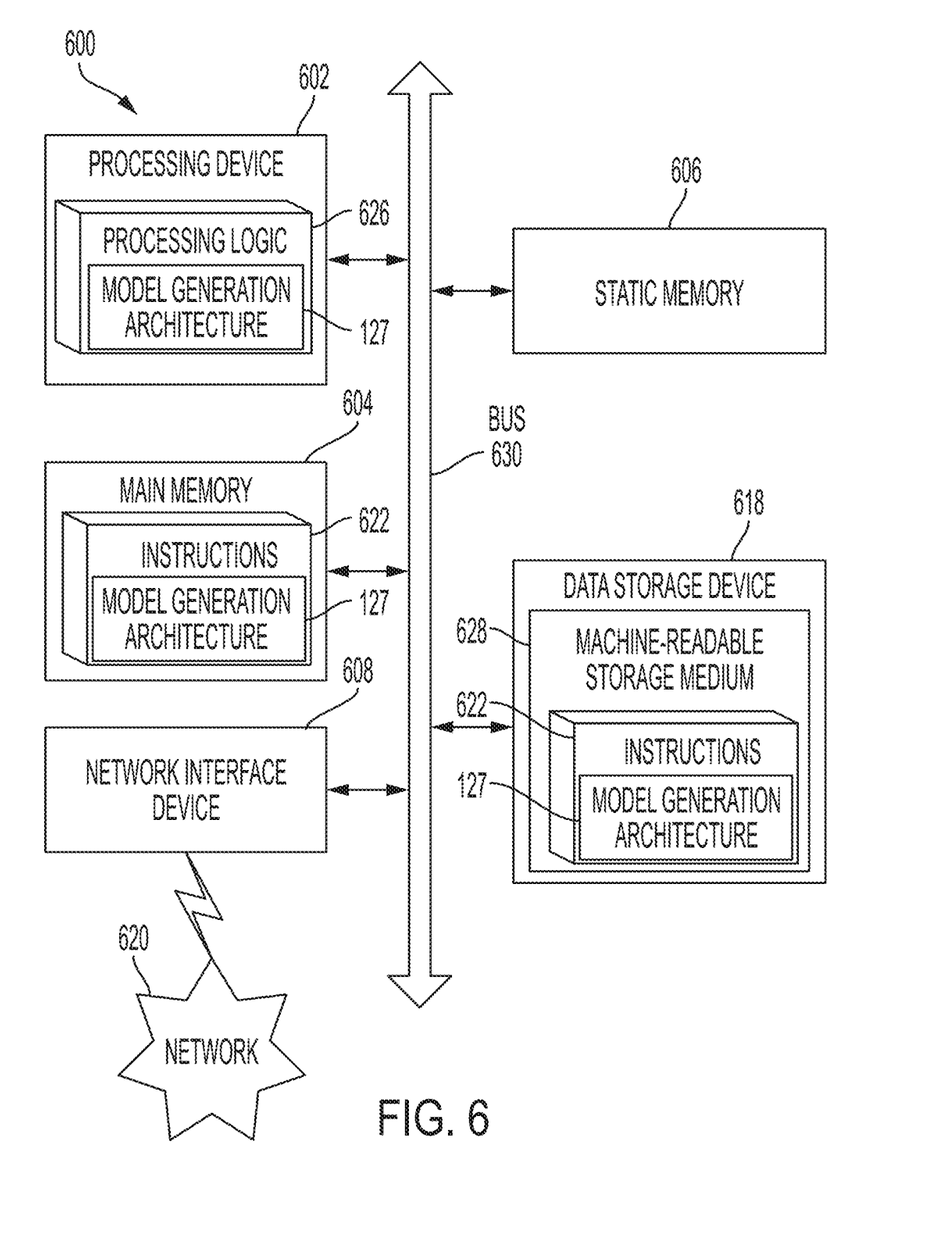
FIG. 6 is an illustration showing an example computing device which may implement the embodiments described herein.

FIG. 6 illustrates a diagrammatic representation of a machine in the example form of a computer system 600 within which a set of instructions 622, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server computer system, such as system 100.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM)), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 100 shown in FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute system 100. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform the methods and operations described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, programming languages, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method of generating an interpretable model for a controller, the method comprising:
 decompiling a binary code of the controller;
 generating a source code based on the binary code of the controller;
 generating one or more abstract syntax trees based on the source code, wherein generating the one or more abstract syntax trees based on the source code comprises generating a first set of code-level abstract syntax trees based on the source code, wherein the generating the first set of code-level abstract syntax trees further comprises identifying a set of mathematical primitives of the source code; and generating, by a processing device, the interpretable model based on the one or more abstract syntax trees, wherein the interpretable model is translatable to binaries by mapping into a language different from that of the interpretable model by a standard that defines a container and an interface to exchange dynamic models, and language encoding control behaviors of the controller.

2. The method of claim 1, wherein generating the one or more abstract syntax trees further comprises:
generating a second set of model-level abstract syntax trees based on the first set of abstract syntax trees.

3. The method of claim 2, wherein generating the first set of abstract syntax trees based on the source code further comprises:
generating the first set of abstract syntax trees based on the mathematical primitives.

4. The method of claim 3, wherein the set of mathematical primitives is identified based on a rule-based classifier or a machine learning based classifier.

5. The method of claim 1, further comprising:
generating second binary code based on the interpretable model; and
testing the second binary code based on a set of tests and the binary code.

6. The method of claim 5, wherein generating the second binary code comprises:
converting the interpretable model into a functional mockup unit (FMU);
integrating the FMU into a control software project (CSP); and
compiling the CSP into the second binary code.

7. The method of claim 6, wherein converting the interpretable model into the FMU comprises using a functional mockup interface (FMI) standard.

8. The method of claim 6, wherein the CSP is expressed in source code.

9. The method of claim 6, wherein the interpretable model is based on a Modelica language.

10. A system of generating an interpretable model, the system comprising:
a memory to store a binary code of a controller; and
a processing device, operatively coupled to the memory, to:
decompile the binary code of the controller;
generate a source code based on the binary code of the controller;
generate one or more abstract syntax trees based on the source code by generating a first set of code-level abstract syntax trees based on the source code, wherein the generating the first set of code-level abstract syntax trees further comprises identifying a set of mathematical primitives of the source code; and
generate the interpretable model based on the one or more abstract syntax trees, wherein the interpretable model is translatable to binaries by mapping into a language different from that of the interpretable model by a standard that defines a container and an interface to exchange dynamic models, and language encoding control behaviors of the controller.

11. The system of claim 10, wherein to generate the one or more abstract syntax trees the processing device is further to:
generate a second set of model-level abstract syntax trees based on the first set of abstract syntax trees.

12. The system of claim 11, wherein to generate the first set of abstract syntax trees based on the source code the processing device is further to:
generate the first set of abstract syntax trees based on the mathematical primitives.

13. The system of claim 12, wherein the set of mathematical primitives is identified based on a rule-based classifier or a machine learning based classifier.

14. The system of claim 10, wherein the processing device is further to:
generate second binary code based on the interpretable model; and
test the second binary code based on a set of tests and the binary code.

15. The system of claim 14, wherein to generate the second binary code the processing device is further to:
convert the interpretable model into a functional mockup unit (FMU);
integrate the FMU into a control software project (CSP); and
compile the CSP into the second binary code.

16. The system of claim 15, wherein to convert the interpretable model into the FMU comprises using a functional mockup interface (FMI) standard.

17. The system of claim 15, wherein the interpretable model is based on a Modelica language.

18. A non-transitory computer-readable storage medium having instructions stored thereon that, when executed by a processing device, cause the processing device to:
decompile a binary code of a controller;
generate a source code based on the binary code of the controller;
generate one or more abstract syntax trees based on the source code by generating a first set of code-level abstract syntax trees based on the source code, wherein the generating the first set of code-level abstract syntax trees further comprises identifying a set of mathematical primitives of the source code; and
generate an interpretable model based on the one or more abstract syntax trees, wherein the interpretable model is translatable to binaries by mapping into a language different from that of the interpretable model by a standard that defines a container and an interface to exchange dynamic models, and language encoding control behaviors of the controller.

19. The non-transitory computer-readable storage medium of claim 18, wherein generating the one or more abstract syntax trees comprises:
generating a second set of model-level abstract syntax trees based on the first set of abstract syntax trees.

20. The non-transitory computer-readable storage medium of claim 19, wherein generating the first set of abstract syntax trees based on the source code comprises:
generating the first set of abstract syntax trees based on the mathematical primitives.

* * * * *